United States Patent [19]

Biermann et al.

[11] Patent Number: 4,630,487
[45] Date of Patent: Dec. 23, 1986

[54] FLOW RATE METER

[75] Inventors: Eberhard Biermann, Uhldingen; Erwin Nägele, Hessigheim; Peter Romann, Stuttgart, all of Fed. Rep. of Germany

[73] Assignee: Robert Bosch GmbH, Stuttgart, Fed. Rep. of Germany

[21] Appl. No.: 695,033

[22] Filed: Jan. 25, 1985

[30] Foreign Application Priority Data

Apr. 13, 1984 [DE] Fed. Rep. of Germany ....... 3414012

[51] Int. Cl.$^4$ ................................................ G01F 1/28
[52] U.S. Cl. ............................................. 73/861.76
[58] Field of Search ............... 73/118, 861.71, 861.74, 73/861.75, 861.76; 123/452, 494

[56] References Cited

U.S. PATENT DOCUMENTS

| 2,072,369 | 3/1937 | Jenson | 73/861.75 |
| 2,873,606 | 2/1959 | Ekstrom, Jr. | 73/861.25 |
| 3,915,138 | 10/1975 | Eckert et al. | 123/452 |
| 4,346,589 | 8/1982 | Kienzle et al. | 73/118 |
| 4,392,386 | 7/1983 | Knetsch et al. | 73/118 |

Primary Examiner—Herbert Goldstein
Attorney, Agent, or Firm—Edwin E. Greigg

[57] ABSTRACT

A flow rate meter which serves to measure a quantity of air aspirated by an internal combustion engine via an air intake tube. The flow rate meter includes a housing, in which a flow conduit having a measuring body is disposed, the measuring body being pivotable about a bearing shaft in accordance with the flow of the medium counter to a restoring force and being joined via at least one strut to a damping body, which in the form of a movable wall defines a damping chamber with respect to the flow conduit. A retaining groove is embodied in the damping chamber wall and is form-fittingly engaged by a retaining section of an elastic stop body. A stop section of the stop body protrudes into the damping chamber and limits the movement of the damping body.

3 Claims, 1 Drawing Figure

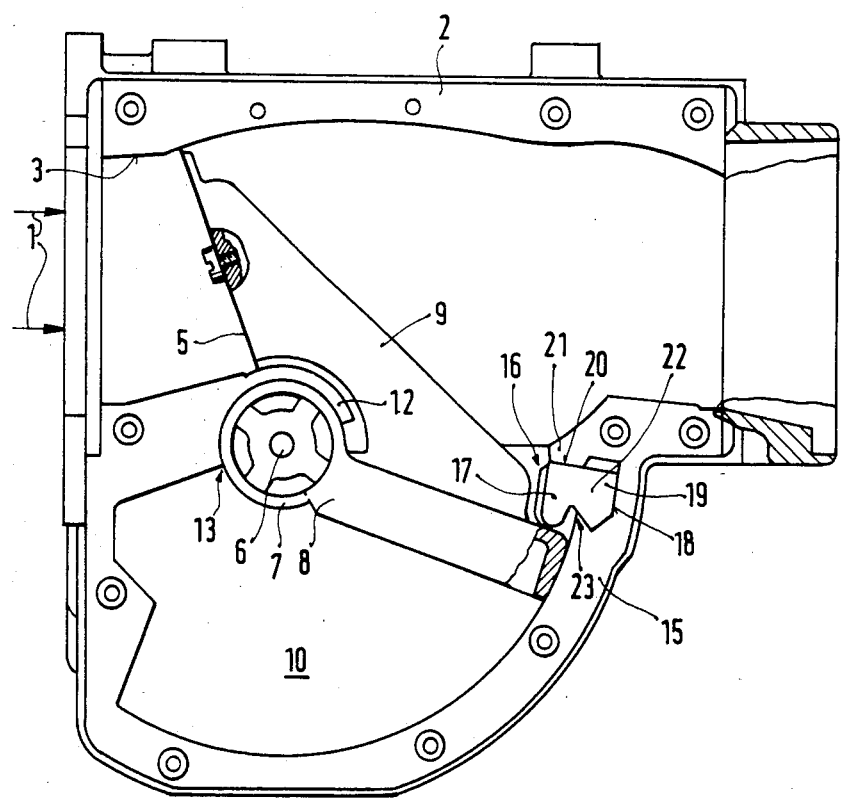

FLOW RATE METER

BACKGROUND OF THE INVENTION

The invention is directed to a flow rate meter. A flow rate meter is already known in which, when the flow rate meter is used in the intake tube of an internal combustion engine, an elastic stop which intercepts the measuring body is provided in order to damp recoiling in the intake tube. In this apparatus, the danger still exists that in unfavorable cases, deformation of the measuring body will still take place. Furthermore, these stops have an unfavorable effect on the flow behavior and cause pressure losses.

OBJECT AND SUMMARY OF THE INVENTION

The flow rate meter according to the invention has the advantage over the prior art that if the flow direction of the medium to be measured suddenly changes counter to the measuring direction, the movement of the measuring body beyond its zero position is braked and damped by a stop body without harmfully deforming the measuring body. Furthermore, the stop body neither unfavorably affects the flow behavior nor causes pressure losses.

Advantageous further embodiments of the flow rate meter disclosed are possible. It is particularly advantageous for a retaining groove to be engaged in a form-fitting manner by the stop body, with a retaining section thereof, while a stop section of the stop body protrudes into the damping chamber. As a result, the retaining body is easily mounted, and additional securing means are not required.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing shows an exemplary embodiment of the invention in simplified form.

DESCRIPTION OF THE PREFERRED EMBODIMENT

In the flow rate meter shown in the drawing, the quantity of air aspirated by an internal combustion engine, for example, flows in the direction of the arrow 1 via a flow conduit 3 embodied in the housing 2 to the individual cylinders of the engine, not shown. A measuring body 5, of the flow rate meter is embodied for instance as a flat plate, having the same shape as the flow conduit at the zero position of the measuring body, is disposed in the flow conduit 3 and is pivotably supported about a bearing shaft 6, which is supported on one side of the flow conduit 3 in the housing 2. The cross section of the flow conduit increases downstream of the opening which permits air to flow by the measuring body as the air flow moves the measuring body. To enable this pivoting, a hub 7 is joined to the bearing shaft 6, and a damping body 8 is joined to the hub 7 and is engaged by one end of at least one strut 9 with the other end of the strut connected to the back side of the measuring body 5. The damping body 8, which is likewise embodied as a flat plate, serves to damp the effect of pulsations in the medium and likewise extends pivotably about the bearing shaft 6 in a damping chamber 10, which is defined with respect to the flow conduit 3 by the damping body 8, in the form of a movable wall. The deflection of the measuring body 5 in the measuring direction is caused by a quantity of air approaching from the direction of the arrows 1, and takes place counter to the spring force of a spiral spring engaging the bearing shaft 6 but not shown in the drawing. The angular position of the measuring body 5 or in other words of the bearing shaft 6 may be picked up electrically, for instance, by a potentiometer as a measure of the quantity of air flowing past the measuring body 5,. A fixed housing wall 12 surrounds and contacts the hub 7 in such a manner that in the pivoting range of the measuring body 5 a leakage gap 13 formed between the hub 7 and the housing wall 12 communicates on the one hand with the damping chamber 10 and on the other with the flow conduit 3 downstream of the measuring body 5, so that because of the equal pressure at both ends of the leakage gap 13, no air flow takes place in the leakage gap 13. The strut 9 between the measuring body 5 and the damping body 8 is spaced apart radially from the housing wall 12.

Because of recoiling in the intake tube, a relatively high pressure can occur in the intake tube, causing a movement of the measuring body 5 counter to the normal air flow direction 1. This movement of the measuring body 5 counter to the measuring direction must be retarded and damped in a suitable manner, in order to prevent damage to the flow rate meter.

To this end, in accordance with the invention an elastic stop body 16 is supported on the damping chamber wall 15 in such a manner that when the medium is not flowing the damping body 8 rests on the stop body 16. In this position, the measuring body 5 is retained in its zero position. In the event of a forceful closing movement of the measuring body 5, caused by occasional intake tube recoiling, the stop body 16, which is made for instance from rubber or plastic, effects a damped stopping of the movement of the damping body 8 within allowable values and causes an overswing on the part of the damping body 8 and the measuring body 5 beyond the zero position without any attendant damage. The stop body 16 has a stop section 17 protruding into the damping chamber 10 at its end, in the vicinity of but outside the flow conduit 3, and a retaining section 19 which form-fittingly engages a retaining groove 18 in the damping chamber wall 15. With its rear surface 20 remote from the damping body 8, the stop section 17 of the stop body 16 is supported on a support protrusion 21 of the housing 2. The stop body 16 is retained in the retaining groove 18 because the transition 22 between the stop section 17 and the retaining section 19 of the stop body 16 is narrowed in the same manner as is the opening 23 of the retaining groove 18 toward the damping chamber 10 as compared with the adjoining area of the retaining groove. The damping behavior of the stop body 16 can be adapted to requirements by appropriate selection of its material and shape. The disposition of the stop body 16 outside the flow conduit 3 in accordance with the invention has the advantage that no additional pressure drop takes place, and the stop body 16 can simply be inserted form-fittingly into the retaining groove 18 parallel to the bearing shaft 6 during mounting, and a change in the position of the stop body 16 parallel to the bearing shaft 6 is prevented by the cover (not shown) of the flow rate meter, which in the mounted state lies parallel to the plane of the drawing and covers the flow conduit and the damping chamber.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A flow rate meter having a housing and a flow conduit embodied in the housing, an air flow measuring body disposed in said flow conduit and pivotable counter to a restoring force about a bearing shaft supported in said housing in accordance with a quantity of medium flowing through said flow conduit, a damping chamber including a wall, a damping body coupled with said air flow measuring body and pivotable about said bearing shaft in said damping chamber, said damping body having a form of a movable wall defining said damping chamber with respect to said flow conduit, in which a pivoting movement of said damping body within said damping chamber toward the flow conduit is limited by means of an elastic stop body supported on said damping chamber wall outside said flow conduit between said damping body and said flow conduit, said stop body includes a retaining section which form-fittingly engages a retaining groove in said damping chamber wall, and a stop section which protrudes into said damping chamber.

2. A flow rate meter as defined by claim 1, in which said stop section of said stop body rests with a rear surface remote from said damping body on a supporting protrusion of said housing.

3. A flow rate meter as defined in claim 1, in which said retaining section of said stop body is narrowed at transition to said stop section and said retaining groove is narrowed at an opening toward said damping chamber.

* * * * *